(12) United States Patent
Akaike et al.

(10) Patent No.: US 11,146,875 B2
(45) Date of Patent: Oct. 12, 2021

(54) SOUND OUTPUT DEVICE

(71) Applicant: SONY CORPORATION, Tokyo (JP)

(72) Inventors: Kazuhiro Akaike, Kanagawa (JP); Tetsu Sumii, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/619,127

(22) PCT Filed: May 8, 2018

(86) PCT No.: PCT/JP2018/017775
§ 371 (c)(1),
(2) Date: Dec. 4, 2019

(87) PCT Pub. No.: WO2018/230192
PCT Pub. Date: Dec. 20, 2018

(65) Prior Publication Data
US 2020/0120410 A1    Apr. 16, 2020

(30) Foreign Application Priority Data

Jun. 13, 2017  (JP) .............................. JP2017-115965
Jul. 18, 2017  (JP) .............................. JP2017-139198

(51) Int. Cl.
*H04R 1/10*    (2006.01)

(52) U.S. Cl.
CPC ........... *H04R 1/1016* (2013.01); *H04R 1/105* (2013.01); *H04R 1/1033* (2013.01); *H04R 1/1041* (2013.01); *H04R 2420/07* (2013.01)

(58) Field of Classification Search
CPC .... H04R 1/1033; H04R 1/105; H04R 1/1058; H04R 1/1066; H04R 1/1091
See application file for complete search history.

(56) References Cited

FOREIGN PATENT DOCUMENTS

| JP | 2003-032773 A | 1/2003 |
|---|---|---|
| JP | 2009-027621 A | 2/2009 |
| JP | 3185367 U | 8/2013 |
| JP | 2016-076202 A | 5/2016 |

OTHER PUBLICATIONS

International Search Report and Written Opinion of PCT Application No. PCT/JP2018/017775, dated Jun. 12, 2018, 06 pages of ISRWO.

*Primary Examiner* — Kile O Blair
(74) *Attorney, Agent, or Firm* — Chip Law Group

(57) ABSTRACT

It is intended to improve usability while securing functionality of a sound output device. There are provided: a neck band to be worn on a user's neck and having an insertion hole; a cable partially led out from the neck band; and an earphone connected to the cable. The cable can be drawn out from the neck band to both sides of the insertion hole, and a length of a portion on both sides of the insertion hole in the cable is changed by changing a position of an inserted portion of the cable in the insertion hole. Since a length of each portion of the cable positioned on both sides of the insertion hole is changed by changing a position of the inserted portion of the cable, it is possible to improve usability while securing functionality of the sound output device.

16 Claims, 8 Drawing Sheets

SOUND OUTPUT DEVICE

CROSS REFERENCE TO RELATED APPLICATIONS

This application is a U.S. National Phase of International Patent Application No. PCT/JP2018/017775 filed on May 8, 2018, which claims priority benefit of Japanese Patent Application No. JP 2017-139198 filed in the Japan Patent Office on Jul. 18, 2017 and also claims priority benefit of Japanese Patent Application No. JP 2017-115965 filed in the Japan Patent Office on Jun. 13, 2017. Each of the above-referenced applications is hereby incorporated herein by reference in its entirety.

TECHNICAL FIELD

The present invention relates to a technical field of a sound output device used by being worn on a user's neck.

BACKGROUND ART

There is a sound output device including a neck band to be worn on a user's neck, a cable partially led out from the neck band, and an earphone connected to a tip end of the cable. In such a sound output device, for example, it is desirable that a cable length can be adjusted in accordance with a use condition, such as shortening the cable length from the earphone to the neck band in a state where the earphone is not worn in the ear.

Consequently, a technique is known in which a cable winding mechanism and the like is provided inside a neck band, and a part of a cable is wound by the winding mechanism and stored in the neck band in a case where an earphone is not worn in the ear (see, for example, Patent Document 1).

CITATION LIST

Patent Document

Patent Document 1: Japanese Patent Application Laid-Open No. 2016-76202

SUMMARY OF THE INVENTION

Problems to be Solved by the Invention

However, in a case where the cable winding mechanism and the like is provided inside the neck band, the sound output device is increased in size and weight, which may increase the burden on the user at the time of wearing and may deteriorate the usability. Furthermore, it is conceivable to reduce a wire diameter of the cable in order to avoid an increase in size of the sound output device. However, in this case, the number of cores of the cable is limited, which may have limited functions of the sound output device, for example, such as making it difficult to provide a noise canceling function and the like.

Accordingly, an object of a sound output device of the present technology is to improve usability while securing functionality.

Solutions to Problems

A sound output device according to the present technology includes: a neck band to be worn on a user's neck and having an insertion hole; a cable partially led out from the neck band; and an earphone connected to the cable. The cable can be drawn out from the neck band to both sides of the insertion hole, and a length of a portion on both sides of the insertion hole in the cable is changed by changing a position of an inserted portion of the cable in the insertion hole.

With this configuration, a length of each portion of the cable positioned on both sides of the insertion hole is changed by changing a position of the inserted portion of the cable.

In the sound output device according to the present technology described above, the neck band desirably has an intermediate unit that is curved or at least partially bent, and an arrangement unit individually continued to both ends of the intermediate unit and arranged with an internal structure.

This arrangement increases a weight of both end portions of the neck band, and facilitates the arrangement unit to be positioned lower than the intermediate unit in a state of being worn on the user's neck.

In the sound output device according to the present technology described above, it is desirable that a diameter of the arrangement unit is made larger than a diameter of the intermediate unit, and the insertion hole is formed in the arrangement unit.

This arrangement allows the cable to be inserted into the large diameter arrangement units present on both end sides of the neck band.

In the sound output device according to the present technology described above, it is desirable that the insertion hole has a first portion extending in a predetermined direction and a second portion inclined with respect to the first portion.

This arrangement allows each opening of the insertion hole to be formed toward any given direction.

In the sound output device according to the present technology described above, two of the arrangement units are desirably positioned apart from each other substantially left and right in a state where the neck band is worn on the user's neck, and when a side where both are facing in two of the arrangement units is defined as an inner side, it is desirable that one opening of the insertion hole is positioned on the inner side, and another opening of the insertion hole is positioned on an outer side.

With this arrangement, a part of the cable drawn out from one opening of the insertion hole is positioned on the inner side of the neck band, while another part of the cable drawn out from another opening of the insertion hole is positioned on the outer side of the neck band.

In the sound output device according to the present technology described above, two of the arrangement units are desirably positioned apart from each other substantially left and right in a state where the neck band is worn on the user's neck, and when a side where both are facing in two of the arrangement units is an inner side, it is desirable that one opening and another opening of the insertion hole are positioned on the inner side.

With this arrangement, each portion of the cable drawn out from both sides of the insertion hole is positioned on the inner side of the neck band.

In the sound output device according to the present technology described above, it is desirable that a lead-out opening through which the cable is led out is formed in the arrangement unit, and the insertion hole is positioned closer to the intermediate unit than the lead-out opening.

This arrangement allows the cable to be drawn out toward the earphone from one opening of the insertion hole positioned closer to the intermediate unit than the lead-out opening.

In the sound output device according to the present technology described above, it is desirable that a lead-out opening through which the cable is led out is formed in the arrangement unit, and the lead-out opening is positioned closer to the intermediate unit than the insertion hole.

This arrangement allows the cable to be led outside of the neck band from the lead-out opening positioned closer to the intermediate unit than the insertion hole.

In the sound output device according to the present technology described above, the cable desirably supports a stopper configured to restrict movement of the cable with respect to the neck band.

This configuration restricts movement of the cable with respect to the neck band in a state where the inserted portion of the cable is at any given position.

In the sound output device according to the present technology described above, the stopper is desirably supported slidably by the cable.

This configuration allows the stopper to move to any position on the cable.

In the sound output device according to the present technology described above, it is desirable that at least a part of the stopper can be inserted into the insertion hole.

This configuration prevents the entire stopper from being positioned outside the neck band.

In the sound output device according to the present technology described above, a diameter of at least a part of the insertion hole desirably decreases as going inward in the neck band.

This configuration causes the stopper to be guided toward inward the neck band by an inner wall forming the insertion hole.

In the sound output device according to the present technology described above, when an end portion connected with the earphone in the cable is defined as one end portion, the stopper is desirably positioned between the one end portion of the cable and the inserted portion.

With this arrangement, when the cable is drawn out in a direction in which a length of the cable from one end portion to the insertion position is shortened, movement of the cable with respect to the neck band is restricted.

In the sound output device according to the present technology described above, the stopper is desirably formed to have an outer shape of a substantially truncated cone shape.

With this configuration, the stopper formed to have an outer shape of a substantially truncated cone shape is positioned between the one end portion and the inserted portion in the cable.

In the sound output device according to the present technology described above, a lead-out opening through which the cable is led out is desirably formed in the arrangement unit, and when a portion positioned in the lead-out opening in the cable is defined as a lead-out starting end, the stopper is desirably positioned between the lead-out starting end and the inserted portion in the cable.

With this configuration, when the cable is drawn out in a direction in which a length from the lead-out starting end to the inserted portion is shortened, the stopper restricts movement of the cable with respect to the neck band.

In the sound output device according to the present technology described above, two of the stoppers are desirably provided and positioned on opposite sides with the inserted portion interposed in between.

With this arrangement, the stopper restricts movement of the cable with respect to the neck band when the cable is drawn out to each of both sides of the insertion hole.

In the sound output device according to the present technology described above, the two stoppers are each desirably formed in different shapes.

This configuration causes tactile sense of the way of stopping in two stoppers to differ.

In the sound output device according to the present technology described above, it is desirable that a communication device is provided as the internal structure, and the communication device is arranged at a tip end portion of the arrangement unit.

This arrangement allows the communication device to be arranged at a position far from the user's body.

Effects of the Invention

According to the present technology, a length of each portion of the cable positioned on both sides of the insertion hole is changed by changing a position of the inserted portion of the cable. Therefore, it is possible to improve usability while securing functionality of the sound output device.

Note that the effects described in this specification are merely examples and are not limited, and other effects may be present.

MODE FOR CARRYING OUT THE INVENTION

Hereinafter, an embodiment for implementing a sound output device of the present technology is described with reference to the accompanying drawings.

An embodiment described below is an application of the sound output device of the present technology to an earphone. However, the application range of the present technology is not limited to earphones, and the present technology can be widely applied to various other sound output devices such as headphones.

In the following description, front, back, upper, lower, left, and right directions are indicated in directions viewed from a user at a time of wearing the sound output device. Note that the front, back, upper, lower, right, and left directions shown below are for convenience of description, and implementation of the present technology is not limited to these directions.

<Configuration of Sound Output Device>

Figure 1:
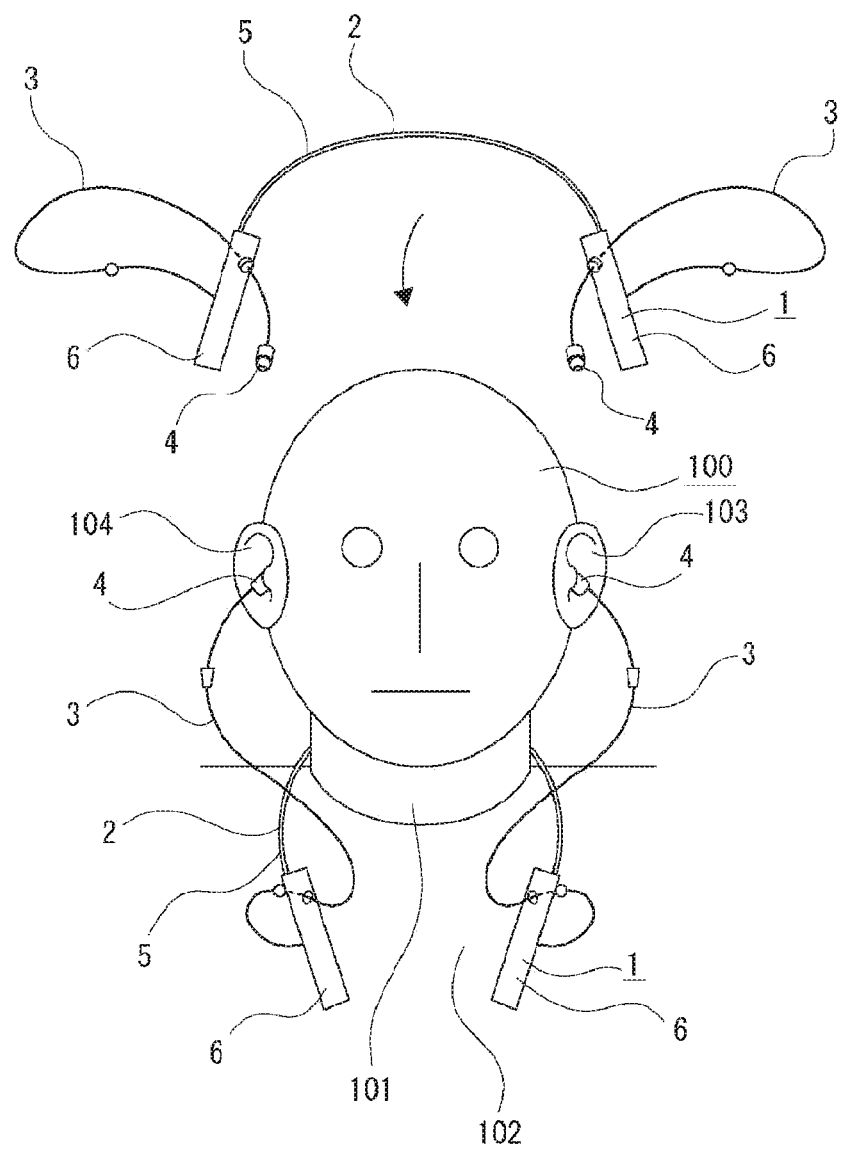
FIG. 1 shows an embodiment of a sound output device of the present technology together with FIGS. 2, 3, 4, 5A, 5B, 6, 7, 8, 9, and 10, and this view is an explanatory view showing a state before and after the sound output device is worn by a user.
Figure 2:
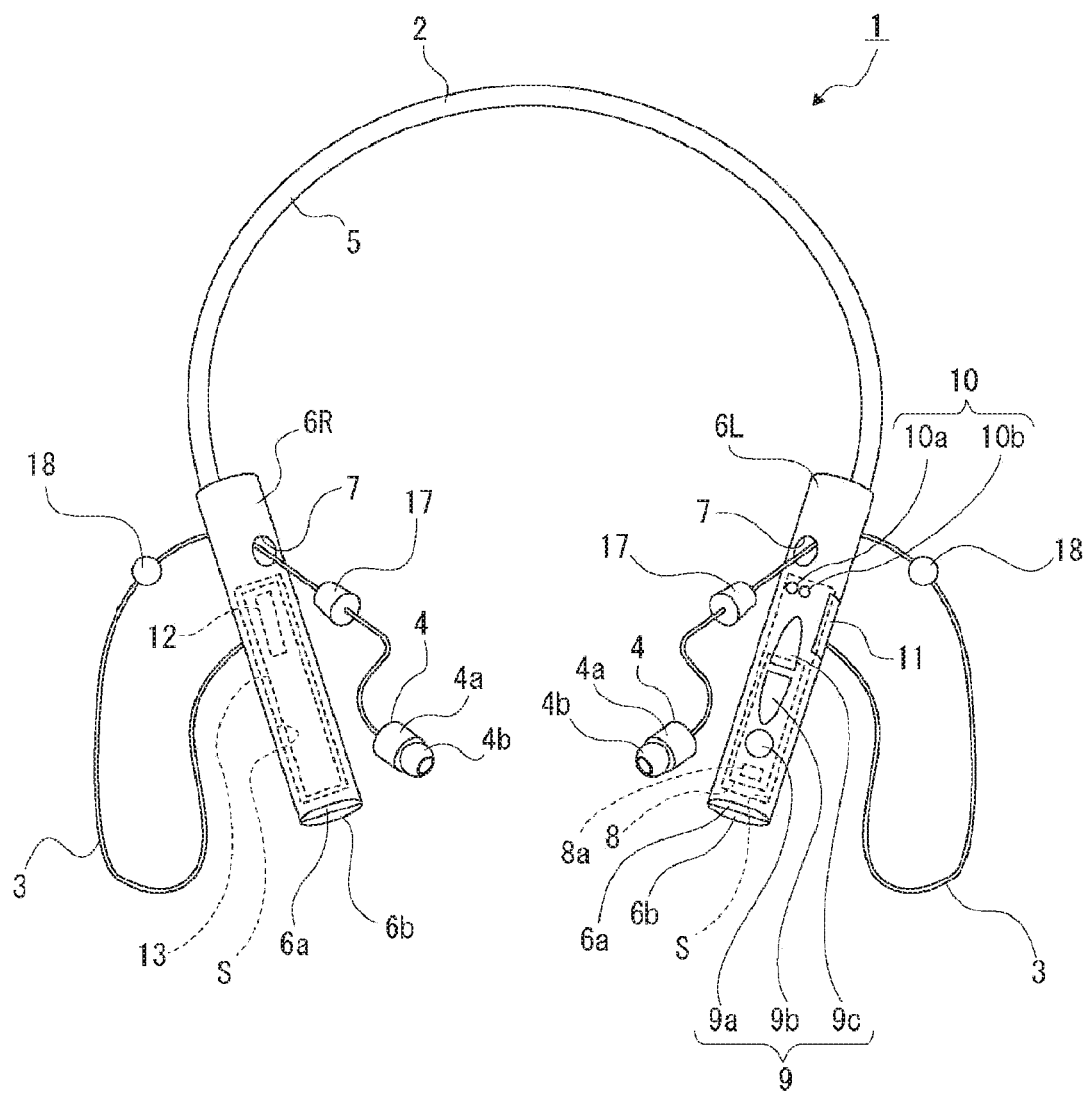
FIG. 2 is a front view of the sound output device.

A sound output device 1 includes a neck band 2 worn on a neck 101 of a user 100, a cable 3 partially led out from the neck band 2, and earphones 4 and 4 individually connected to tip ends of the cable 3 (see FIGS. 1 and 2).

In the sound output device 1, the neck band 2 is worn on the neck 101 of the user 100 from a back side of the user 100. The neck band 2 is formed in a U-shape opened downward, for example, in a state of being worn on the neck 101, and both end portions are apart from each other left and right and positioned near a chest 102 of the user 100.

The neck band 2 has an intermediate unit 5 that is curved or at least partially bent, and arrangement units 6 and 6 that are individually continued to both ends of the intermediate unit 5. A stable state of the sound output device 1 being worn by the user 100 is maintained by the arrangement units 6 and 6 of the neck band 2 being positioned lower than the neck 101 of the user 100.

The cable 3 is individually led out from the arrangement units 6 and 6 of the neck band 2. In a state where the sound output device 1 is worn by the user 100, the earphones 4 and 4 connected to the cable 3 are individually worn in a left ear 103 and a right ear 104 of the user.

In the neck band 2, at least the intermediate unit 5 is formed by an elastically deformable material, and is curved so as to be elastically deformable in a direction in which the arrangement units 6 and 6 are mutually contacting and separating. Inside the intermediate unit 5, for example, a part of the cable 3 is disposed.

In a state where the neck band 2 is worn on the neck 101 of the user 100, a part of the intermediate unit 5 is positioned on a back side of the neck 101, and the arrangement units 6 and 6 are positioned on a front side of the chest 102.

When the neck band 2 is worn on the neck 101 of the user 100, the intermediate unit 5 is elastically deformed such that the arrangement units 6 and 6 are separated from each other. In a worn state, the intermediate unit 5 is elastically restored such that the arrangement units 6 and 6 approach each other (see FIG. 1). This configuration facilitates the neck band 2 to be worn on the neck 101, and makes it difficult for the neck band 2 to come off from the neck 101 in the worn state, to secure a stable wearing state of the sound output device 1.

The arrangement units 6 and 6 are formed in symmetrical shapes. In the following, the arrangement unit 6 provided on the left side will be described as an example unless otherwise stated.

The arrangement unit 6 is formed by, for example, a resin material so as to have a substantially cylindrical outer shape, and has a shape extending in a direction continuous with the intermediate unit 5. The arrangement unit 6 includes, for example, a first member 6a and a second member 6b bound in a direction orthogonal to an axial direction thereof, and an internal space is formed as an arrangement space S. In the arrangement space S, an internal structure as described later is arranged. At a position closer to the intermediate unit 5 in the arrangement unit 6, an insertion hole 7 through which the cable 3 is inserted is formed. Note that the arrangement unit 6 is not limited to the structure where the first member 6a and the second member 6b are bound, but may be entirely formed by bonding of one or three or more members.

The arrangement unit 6 is formed to have a diameter larger than that of the intermediate unit 5. Since the cable 3 is inserted into the arrangement unit 6 having a diameter larger than that of the intermediate unit 4, the cable 3 can be easily drawn out, and a sufficient arrangement space between the cable 3 and the internal structure can be secured.

In a state where the neck band 2 is worn on the neck 101 of the user 100, as described above, the arrangement units 6 and 6 are each positioned apart from each other substantially left and right, and a side where the arrangement units 6 and 6 are facing in the neck band 2 is an inner side.

Since various internal structures are arranged in the arrangement units 6 and 6, the arrangement units 6 and 6 have a weight greater than that of the intermediate unit 5. Therefore, the weight of both end portions of the neck band 2 increases, the arrangement units 6 and 6 are easily positioned lower than the intermediate unit 5 in a state where the neck band 2 is worn on the neck 101 of the user 100, and a stable wearing state of the neck band 2 can be secured.

Hereinafter, with the arrangement unit 6 positioned on the left side of the user 100 defined as an arrangement unit 6L and the arrangement unit 6 positioned on the right side defined as an arrangement unit 6R when the neck band 2 is worn, a configuration peculiar to the arrangement units 6L and 6R is described.

In the arrangement space S of the arrangement unit 6L, for example, as an internal structure, a control board 8, a microphone (not shown), a vibration motor (not shown), and the like are arranged (see FIG. 2).

The control board 8 is formed with a drive circuit that operates a speaker as described later, and an antenna 8a for wireless communication as a communication device. Therefore, the sound output device 1 can receive a sound signal from an external device such as a music player by wireless communication, and convert the received sound signal to output as sound from the speaker. As the wireless communication for receiving a sound signal, for example, Bluetooth (registered trademark) or wireless fidelity (Wi-Fi, registered trademark) is used.

The antenna 8a as a communication device formed on the control board 8 is positioned at an end portion opposite to the intermediate unit 5 in the arrangement space S. The communication sensitivity of the antenna 8a tends to be higher as being positioned farther from the body of the user 100. Therefore, by arranging the antenna 8a at the end portion opposite to the intermediate unit 5 in the arrangement space S far from the body of the user 100, a good communication state can be secured.

The microphone functions as a sound input device to which external sound is inputted. The microphone is connected to the control board 8, and the inputted sound signal is transmitted to an external device via, for example, a communication device. To the microphone, sound is inputted through a sound input hole (not shown) formed in the arrangement unit 6.

The vibration motor is controlled by the control board 8 and notifies the user 100 of an operation state of the sound output device 1 by a predetermined vibration mode. The vibration motor notifies the user 100 of reception of a call request from another call terminal, for example, by vibrating.

On an outer peripheral portion of the arrangement unit 6L, a plurality of operation buttons 9, 9, . . . connected to the control board 8 is provided. As the operation buttons 9, 9, . . . , for example, a main operation button 9a, a first adjustment button 9b, and a second adjustment button 9c are provided apart in a longitudinal direction of the arrangement unit 6L. When the main operation button 9a is subjected to long depression, power to the sound output device 1 is turned on or off. When the main operation button 9a is subjected to short depression in the power-on state, sound is reproduced or stopped. Furthermore, it is possible to perform track forward, track reverse, fast reverse, execution of a pairing function with an external device, and the like by a predetermined operation of the main operation button 9a.

When the first adjustment button 9b or the second adjustment button 9c is subjected to short depression in the power-on state, volume of the sound to be outputted is increased or decreased. Note that the function of each operation button 9 is not limited to the above, and one operation button 9 may be configured to realize a plurality of functions by a predetermined operation mode such as long depression or short depression. Furthermore, the configuration may be such that the operation buttons 9, 9, . . . each having a predetermined function are provided.

The arrangement unit 6L is provided with a lighting unit 10 connected to the control board 8. As the lighting unit 10, for example, a light emitting diode (LED) is used. As the lighting unit 10, a first lighting unit 10a indicating a charging state and a second lighting unit 10b indicating an operation state of the sound output device 1 are provided. By visually recognizing a lighting state of the lighting unit 10, the user 100 can easily check the operation state of the sound output device 1.

In the arrangement unit 6L, a terminal unit 11 is provided. For example, a universal serial bus (USB) terminal is used as the terminal unit 11. Using the terminal unit 11 makes it possible to perform charging of a battery as described later, input/output of sound data, and the like.

In the arrangement space S of the arrangement unit 6R, a short-distance wireless communication unit 12, a battery 13, and the like are arranged.

The short-distance wireless communication unit 12 as a communication device is, for example, a near field communication (NFC) tag, and has a function of pairing processing and the like such as connection authentication. The short-distance wireless communication unit 12 is connected to the control board 8 via a cable (not shown) disposed in the intermediate unit 5, and cooperates with the control board 8 to realize wireless communication.

The short-distance wireless communication unit 12 is held, for example, in a state of being affixed to the arrangement space S.

The battery 13 is a chargeable type, for example, and is connected to the terminal unit 11 of the arrangement unit 6L via the cable 3 arranged in the intermediate unit 5. The battery 13 is supplied with electric power from outside via the terminal unit 11. Electric power of the battery 13 is supplied to the control board 8, the microphone, the vibration motor, the lighting unit 10, and the like described above. Note that the battery 13 may be a disposable type, and in this case, it is desirable that a part of the arrangement unit 6R is openable and closable, and the battery 13 is replaceable. Furthermore, even in a case where the battery 13 is of a chargeable type, a part of the arrangement unit 6 may be openable and closable, and the battery 13 may be replaceable.

The above has shown the configuration in which various internal structures are dispersed and arranged in the arrangement unit 6L and the arrangement unit 6R. With this configuration, the weight of the neck band 2 can be easily dispersed evenly to the left and right, and a stable wearing state can be maintained in a state where the neck band 2 is worn on the neck 101. Note that the internal configuration of the arrangement unit 6 is not limited to the above. For example, the configuration may be such that all the internal structures are arranged in one of the arrangement unit 6L or the arrangement unit 6R.

Next, a schematic configuration of the earphone 4 will be described with reference to FIG. 2. The earphone 4 is a canal type earphone, for example, and includes: a speaker (not shown) that converts a sound signal into vibration to output as sound; a casing 4a in which the speaker is disposed; and an earpiece 4b attached to the casing 4a.

Note that, although the canal type earphone has been shown as the earphone 4 above, other types of earphones, such as inner-ear type, may be used, for example.

Hereinafter, a detailed configuration of the arrangement unit 6 will be described with reference to FIGS. 3 and 4. In the arrangement unit 6, a lead-out hole 14 whose one end is in communication with the arrangement space S is formed (see FIG. 3). An opening at another end of the lead-out hole 14 is formed as a lead-out opening 14a that opens to the outer side of the neck band 2.

The insertion hole 7 is formed at a position closer to the intermediate unit 5 than the lead-out opening 14a. The insertion hole 7 penetrates the arrangement unit 6 substantially in the left-right direction.

The openings on both sides of the insertion hole 7 are individually formed as a first opening 7a and a second opening 7b. The first opening 7a is positioned on the inner side of the neck band 2, and the second opening 7b is positioned on the outer side.

Figure 4:
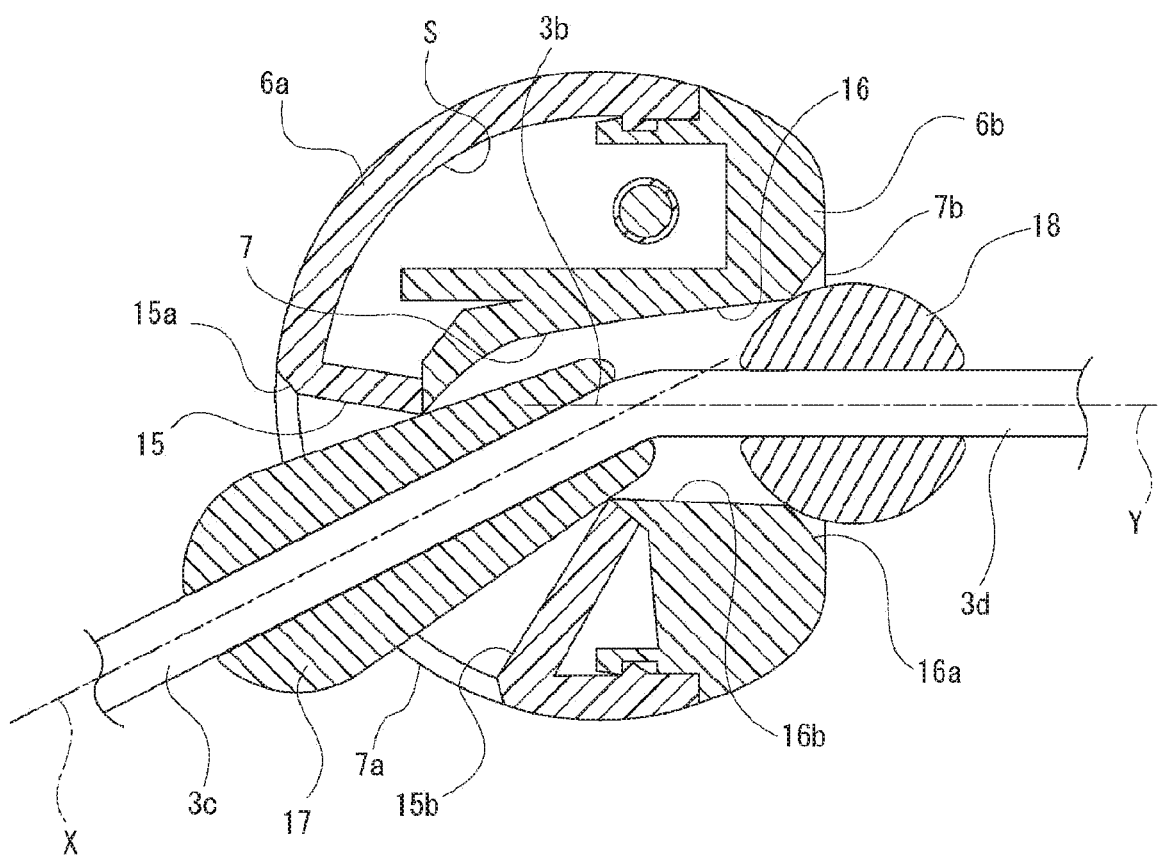
FIG. 4 is a cross-sectional view showing an insertion state of a cable with respect to an insertion hole.

The insertion hole 7 includes a first insertion part 15 continued to the first opening 7a, and a second insertion part 16 continued to the second opening 7b (see FIG. 4). The first insertion part 15 and the second insertion part 16 are in communication at an end portion opposite to the first opening 7a and an end portion opposite to the second opening 7b. In the first insertion part 15 and the second insertion part 16, a part of a stopper as described later can be individually inserted.

In the insertion hole 7, the first insertion part 15 extends in a predetermined direction X, and the second insertion part 16 extends in a predetermined direction Y. The direction Y is inclined with respect to the direction X, and the second insertion part 16 is inclined with respect to the first insertion part 15. With this arrangement, orientation of the first opening 7a and the second opening 7b of the insertion hole 7 is not limited to a single axial direction, and the cable 3 can be drawn out from the insertion hole 7 in a desired direction by individually forming the first opening 7a and the second opening 7b toward a desired direction (any direction).

The first insertion part 15 has a guide part 15a continued to the first opening 7a, and a communication part 15b continued to the guide part 15a.

The guide part 15a is formed at an end portion of the first insertion part 15 on the first opening 7a side, and is formed to have a smaller diameter as going inward the neck band 2. The communication part 15b is formed to have a smaller diameter as going inward the neck band 2, and is formed, for example, in a mortar shape in a cross-sectional shape. An axial length of the communication part 15b is longer than an axial length of the guide part 15a.

The second insertion part 16 has a guide part 16a continued to the second opening 7b, and a communication part 16b continued to the guide part 16a.

The guide part 16a is formed at an end portion of the second insertion part 16 on the second opening 7b side, and is formed to have a smaller diameter as going inward the neck band 2. The communication part 16b is formed to have a smaller diameter as going inward of the neck band 2, and is in communication with the communication part 15b of the first insertion part 15.

Note that, although the example has been shown above in which the first insertion part 15 and the second insertion part 16 are formed in different shapes, the second insertion part 16 may be formed in the same shape as the first insertion part 15. Furthermore, although the example has been shown above in which the second insertion part 16 is inclined with respect to the first insertion part 15, the insertion hole 7 may be formed with the first insertion part 15 and the second insertion part 16 being in a straight line. Furthermore, the first insertion part 15 and the second insertion part 16 are not limited to the shape described above, but may have, for example, a shape in which the guide part 15a and the guide part 16a are not formed.

Hereinafter, with reference to FIGS. 3, 4, 5A, and 5B, a drawn-out state of the cable 3 from the arrangement unit 6 is described. The cable 3 is led out to the outer side of the neck band 2 from the lead-out opening 14a (see FIG. 3). In the cable 3, a portion positioned in the lead-out opening 14a is defined as the lead-out starting end 3a.

The cable 3 led out to the outside of the neck band 2 is inserted into the insertion hole 7, and can be drawn out on both sides of the insertion hole 7. In the cable 3, a portion positioned in the insertion hole 7, in other words, a portion from the first opening 7a to the second opening 7b is defined as the inserted portion 3b (see FIG. 4).

Figure 3:
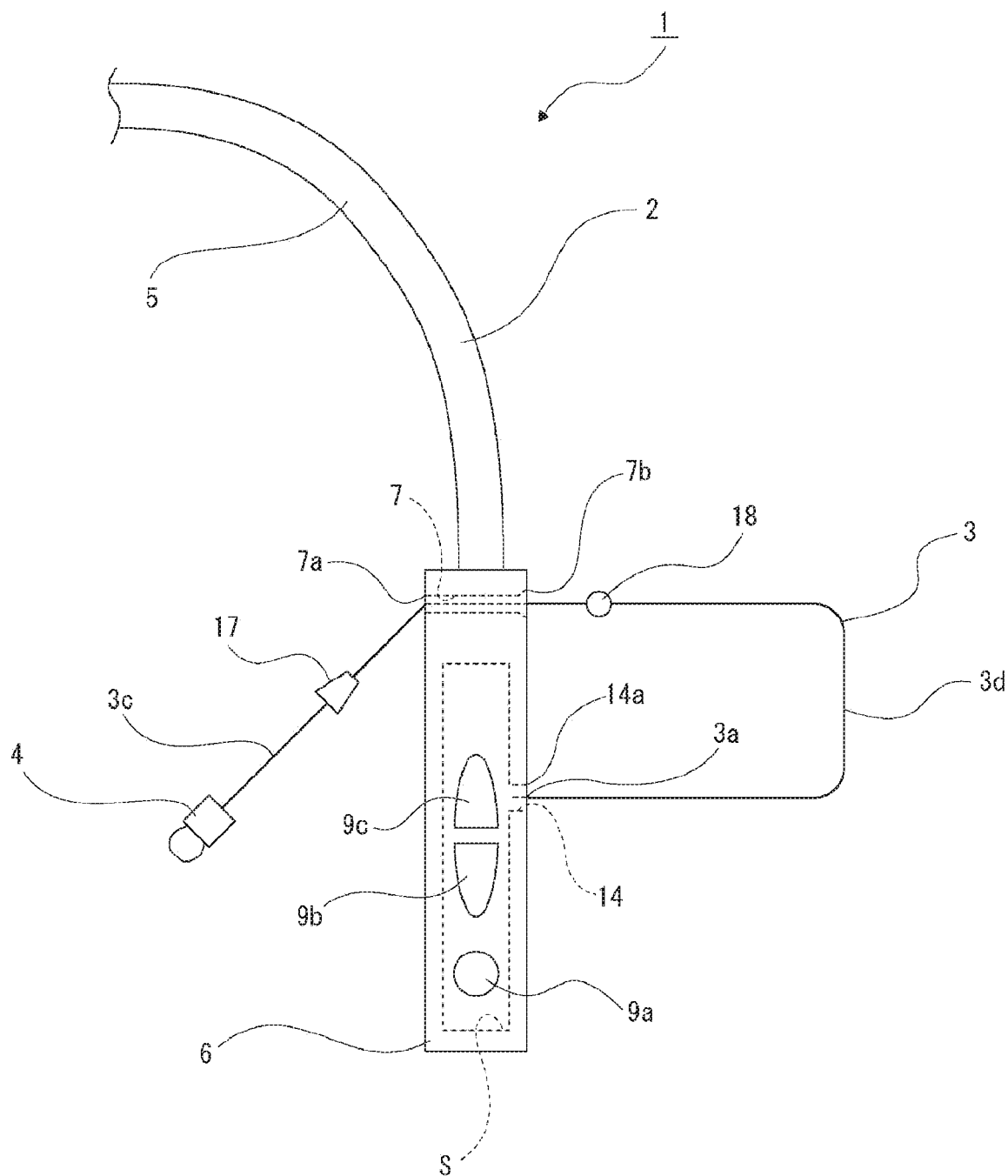
FIG. 3 is a front view showing a part of the sound output device.

When a portion from the one end portion connected with the earphone 4 in the cable 3 to connecting to the inserted portion 3b is defined as a first portion 3c, the first portion 3c is a portion drawn out from the first opening 7a of the insertion hole 7 to the inner side of the neck band 2 (see FIG. 3). In other words, in a state where the sound output device 1 is worn by the user 100, the first portion 3c is positioned on the neck 101 side of the user 100 (see FIGS. 5A and 5B).

When a portion from the lead-out starting end 3a of the cable 3 to connecting to the inserted portion 3b is defined as a second portion 3d, the second portion 3d is a portion drawn out from the second opening 7b of the insertion hole 7 to the outer side of the neck band 2 (see FIG. 3). In a state where the sound output device 1 is worn by the user 100, the second portion 3d is positioned outward from the neck 101 of the user 100 (see FIGS. 5A and 5B).

In the cable 3, a length from the lead-out starting end 3a to one end portion connected with the earphone 4 is made constant. Therefore, in a case where the cable 3 is drawn out from the insertion hole 7 as the first portion 3c, the length of the second portion 3d is shortened. Conversely, in a case where the cable 3 is drawn out from the insertion hole 7 as the second portion 3d, the length of the first portion 3c is shortened.

Note that, in FIG. 4 and the like, although an example has been shown in which a surface of the cable 3 is formed in a curved shape, a plurality of uneven portions extending in an axial direction and arranged in a circumferential direction of the cable 3 may be formed on the surface of the cable 3. This configuration can reduce touch noise even in a case where a hand of the user 100 touches the cable 3.

Figure 5A:
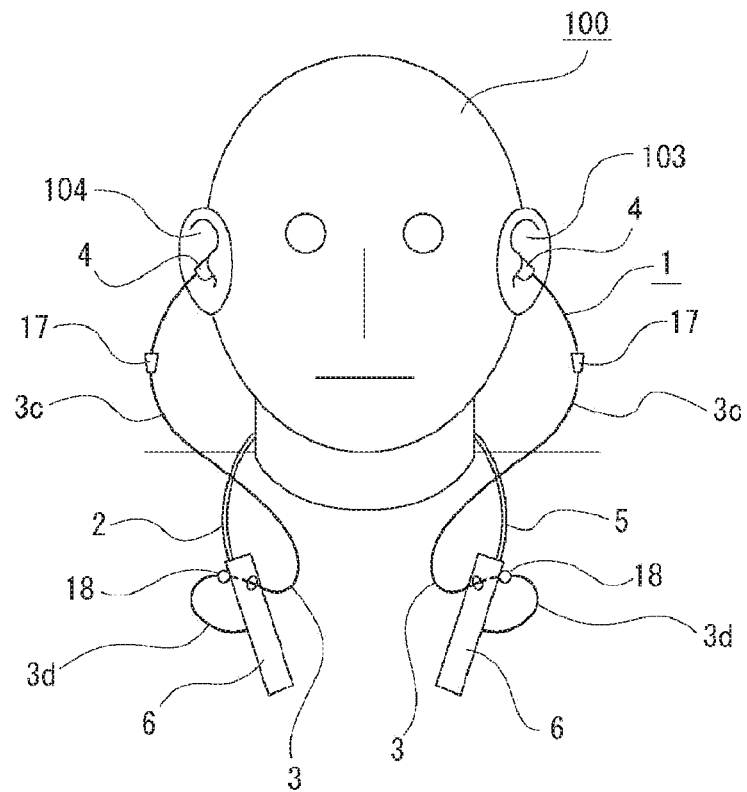
FIGS. 5A and 5B is an are explanatory views showing a state where the sound output device is worn by a user.
Figure 5B:
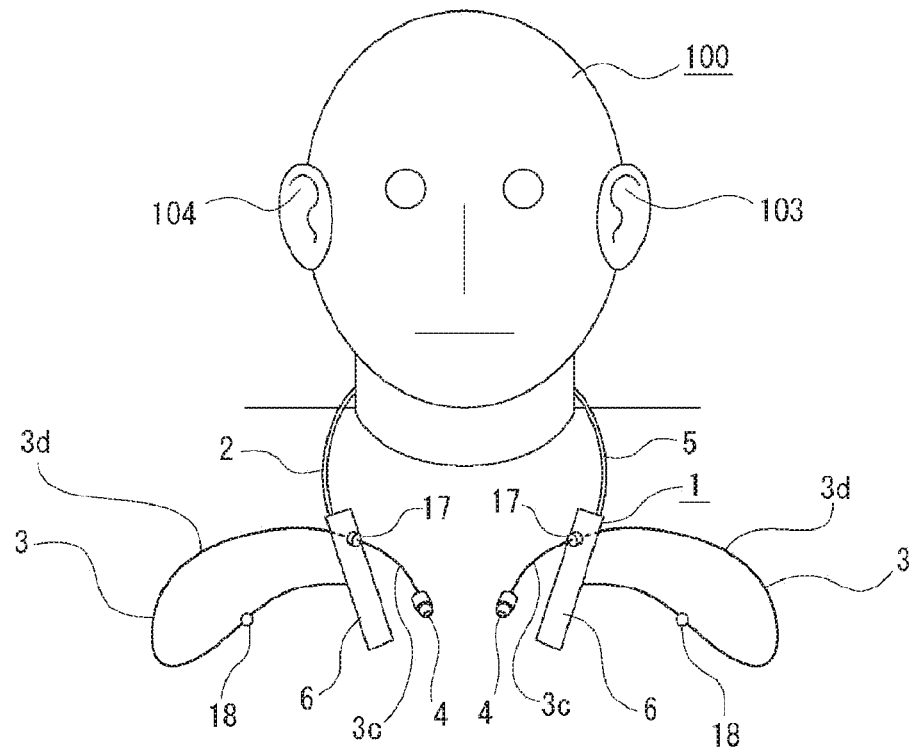

Next, with reference to FIGS. 5A and 5B, a description is given to a drawn-out state of the cable 3 from the arrangement unit 6 in a state where the sound output device 1 is worn by the user 100.

FIG. 5A shows a state where the earphones 4 and 4 are worn in the ear of the user 100 when the sound output device 1 is used. At this time, the first portion 3c of the cable 3 is made longer than the second portion 3d.

Whereas, in a state where the earphone 4 is removed from the ear, in a case where the first portion 3c is made to have the same length as that when the earphone 4 is worn, usability may be deteriorated such as when the first portion 3c hangs down due to the weight of the earphone 4 and comes into contact with a hand or the like of the user 100. Therefore, it is desirable to increase the length of the second portion 3d and shorten the length of the first portion 3c by drawing out the cable 3 from the insertion hole 7 and changing the position of the inserted portion 3b of the cable 3 (see FIG. 5B).

Thus, by adjusting the drawn-out state of the cable 3 so as to make the first portion 3c of the cable 3 shorter than the second portion 3d, the first portion 3c does not interfere with the user 100.

In a case of wearing the earphones 4 and 4 again from the non-worn state of the earphones 4 and 4 shown in FIG. 5B, it is desirable to increase the length of the first portion 3c by drawing out the cable 3 toward the inner side from the insertion hole 7 to change the position of the inserted portion 3b of the cable 3 (see FIG. 5A).

With the above configuration, by changing the position of the inserted portion 3b of the cable 3, the lengths of the first portion 3c and the second portion 3d positioned on both sides of the insertion hole 7 are changed in accordance with a usage state of the sound output device 1.

Hereinafter, configurations of a first stopper 17 and a second stopper 18 supported by the cable 3 will be described with reference to FIGS. 3, 4, 5A, and 5B.

In the cable 3, the first stopper 17 and the second stopper 18 are each slidably supported on both sides with the inserted portion 3b interposed in between (see FIG. 3). In the cable 3, the first stopper 17 is supported at a portion between the end portion connected to the earphone 4 and the inserted portion 3b, and the second stopper 18 is supported at a portion between the lead-out position 3a and the inserted portion 3b.

The first stopper 17 and the second stopper 18 are formed by, for example, a resin material such as polyvinyl chloride (PVC), and have a through hole (not shown) through which the cable 3 penetrates.

Since the first stopper 17 and the second stopper 18 are slid with respect to the cable 3 by applying a certain force of a certain level or more in an axial direction of the through hole, the first stopper 17 and the second stopper 18 can be moved to a desired position on the cable 3. In a state where a force of a certain level or more is not applied, the first stopper 17 and the second stopper 18 are held at a predetermined position of the cable 3, and moved along with the cable 3.

The first stopper 17 is formed such that a diameter decreases as approaching the lead-out starting end 3a. The first stopper 17 is formed to have an outer shape of, for example, a substantially truncated cone shape. An outer peripheral surface of the first stopper 17 is formed in a curved surface shape, and when the first stopper 17 is moved along with the cable 3, the first stopper 17 is unlikely to be caught by clothes or the like of the user 100.

When the cable 3 is drawn out in a direction in which the second portion 3d becomes long, the first stopper 17 is moved toward the insertion hole 7 along with the cable 3, and is partially inserted into the first insertion part 15 (see FIG. 4). A part of the first stopper 17 is guided by a wall surface forming the guide part 15a and inserted into the first insertion part 15, and a part is held in a state of being in contact with a part of the wall surface forming the communication part 15b, or with a boundary portion between the communication part 15b and the communication part 16b. At this time, movement of the first stopper 17 is restricted by a side pressure from a wall surface forming the insertion hole 7, and movement of the cable 3 with respect to the neck band 2 is restricted.

With the above configuration, by holding the first stopper 17 at a desired position of the cable 3, it is possible to prevent excessive drawing of the cable 3 in the direction in which the second portion 3*d* becomes long. Therefore, the second portion 3*d* is prevented from being excessively long, and the cable 3 is not easily touched unintentionally by a hand or the like of the user 100 that is often positioned outward of the arrangement unit 6.

The second stopper 18 is formed to have an outer shape of, for example, a substantially spherical shape.

When the cable 3 is drawn out in a direction in which the first portion 3*c* becomes long, the second stopper 18 is moved toward the insertion hole 7 along with the cable 3, and is partially inserted into the second insertion part 16 (see FIG. 4). A part of the second stopper 18 is guided by a wall surface forming the guide part 16*a* and inserted into the second insertion part 16, and is contacted with a part of the wall surface forming the guide part 16*a* or with a boundary portion between the guide part 16*a* and the communication part 16*b*. At this time, movement of the cable 3 with respect to the neck band 2 is restricted.

With the above configuration, by holding the second stopper 18 at a predetermined position of the second portion 3*d*, it is possible to prevent excessive drawing of the cable 3 in the direction in which the first portion 3*c* becomes long. Therefore, the first portion 3*c* is prevented from being excessively long, and the hanging of the first portion 3*c* is suppressed.

In the configuration described above, the first stopper 17 and the second stopper 18 are held on both sides with the inserted portion 3*b* interposed in between. Therefore, when the cable 3 is drawn out to each of both sides of the insertion hole 7, the first stopper 17 or the second stopper 18 restricts movement of the cable 3 with respect to the neck band 2, and excessive drawing of the cable 3 can be prevented on both sides of the insertion hole 7. Moreover, the inserted portion 3*b* is fixed at a desired position by reliably restricting the movement of the cable 3 from both sides of the insertion hole 7, and each of the first portion 3*c* and the second portion 3*d* can be kept at a desired length (see FIG. 4). By keeping the first portion 3*c* at a desired length, unintentional removal of the earphone 4 from the ear due to change in the length of the first portion 3*c* can be prevented. Furthermore, by keeping the second portion 3*d* at a desired length, the second portion 3*d* having a desired length or more is not positioned outward of the neck band 2, and is less likely to interfere with the user 100.

In the configuration described above, at least a part of each of the first stopper 17 and the second stopper 18 can be inserted into the insertion hole 7. Therefore, since the first stopper 17 and the second stopper 18 are not entirely positioned outside the neck band 2, the user 100 is less likely to be disturbed.

Furthermore, in the configuration described above, the first stopper 17 and the second stopper 18 are formed in different shapes. Therefore, the tactile senses of the first stopper 17 and the second stopper 18 are different, and the user 100 can easily distinguish the first stopper 17 and the second stopper 18 by touching with a hand.

Note that the shape of the second stopper 18 is not limited to the shape described above. For example, the second stopper 18 may be formed to have an outer shape of a substantially truncated cone shape. In this case, movement of the cable 3 can be reliably restricted on both sides of the insertion hole 7.

Note that the shape of the first stopper 17 is also not limited to the shape described above. For example, the first stopper 17 may be formed to have an outer diameter of a substantially spherical shape. Furthermore, the shapes of the first stopper 17 and the second stopper 18 are not limited to the outer shapes of the substantially truncated cone shape and the substantially spherical shape, but may be formed into any shape.

SUMMARY

As described above, in the sound output device 1, the cable 3 can be drawn out from the neck band 2 to both sides of the insertion hole 7, and a length of a portion on both sides of the insertion hole 7 in the cable 3 is changed by changing a position of the inserted portion 3*b* of the cable 3 in the insertion hole 7.

With this configuration, since a length of each portion of the first portion 3*c* and the second portion 3*d* positioned on both sides of the insertion hole 7 is changed by changing the position of the inserted portion 3*b* of the cable 3, it is possible to improve usability while securing functionality of the sound output device 1.

Furthermore, in the sound output device 1 described above, the first opening 7*a* of the insertion hole 7 is positioned on the inner side, and the second opening 7*b* is positioned on the outer side.

With this arrangement, the first portion 3*c* drawn out from the first opening 7*a* of the insertion hole 7 is positioned on the inner side of the neck band 2 (the neck 101 side of the user 100), and the second portion 3*d* drawn out from the second opening 7*b* is positioned on the outer side of the neck band 2 (outward from the neck 101 of the user 100). Since a hand of the user 100 is often positioned outward of the arrangement unit 6 in a state where the neck band 2 is worn on the neck 101, the second portion 3*d* positioned on the outer side of the neck band 2 is easily drawn out by the user 100.

Furthermore, in the sound output device 1 described above, the insertion hole 7 is positioned closer to the intermediate unit 5 than the lead-out opening 14*a*.

Therefore, the first portion 3*c* of the cable 3 is drawn out from the first opening 7*a* of the insertion hole 7 positioned closer to the intermediate unit 5 than the lead-out opening 14*a*. Since a distance from the insertion hole 7 to the ear of the user 100 is short, the length of the first portion 3*c* of the cable 3 drawn out from the first opening 7*c* of the insertion hole 7 is shortened when the earphone 4 is worn, and hanging of the first portion 3*c* can be suppressed.

<Another Configuration Example of Sound Output Device>

Hereinafter, with reference to FIGS. 6 to 10, another configuration example of the sound output device of the present technology is described.

Figure 6:
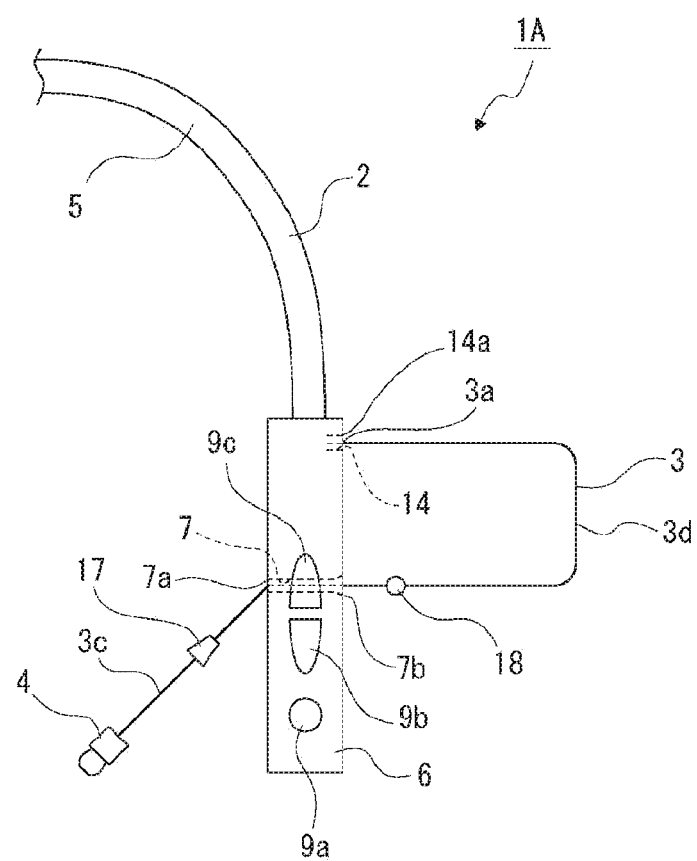

In a sound output device 1A of a first configuration example, the lead-out opening 14*a* is positioned closer to the intermediate unit 5 than the insertion hole 7 (see FIG. 6).

In the sound output device 1A, the cable 3 is led out from the lead-out opening 14*a* to the outer side of the neck band 2, and inserted into the insertion hole 7. At this time, the second portion 3*d* is positioned closer to the intermediate unit 5 than the first portion 3*c*. In this case, in a state where the earphone 4 is not worn in the ear when the neck band 2 is worn, the first portion 3*c* is at a position farther from the neck 101 than the second portion 3*d*. Therefore, the first portion 3*c* is less likely to be in contact with the neck 101 or the like, and is less likely to interfere with the user 100. Moreover, since the first portion 3*c* is at a position closer to a hand of the user 100 than the second portion 3*d* in the up-down direction in a state where the earphone 4 is not worn in the ear, the user 100 can easily wear the earphone 4 by picking up the earphone 4 connected to the first portion 3*c* or a tip end thereof.

Figure 7:
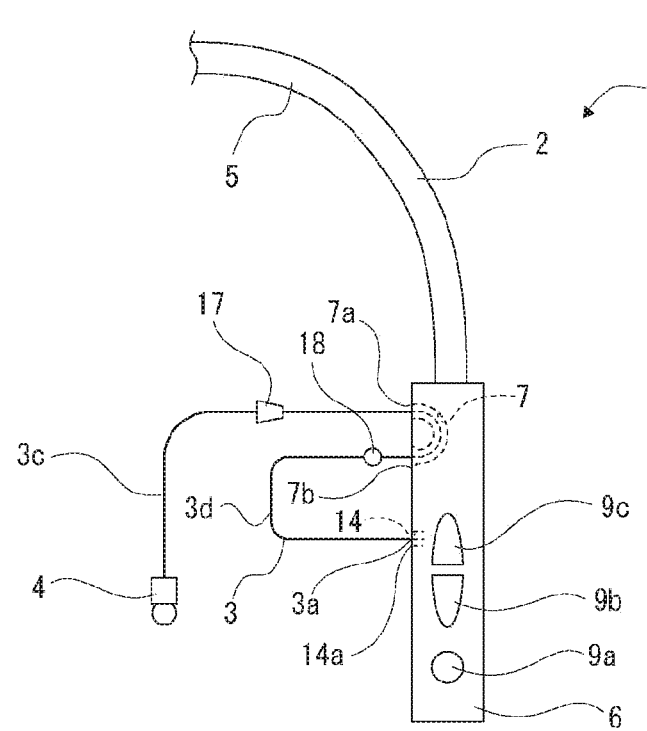

In a sound output device 1B of a second configuration example, the lead-out opening 14*a* is positioned on the inner side of the neck band 2 (see FIG. 7).

In the arrangement unit 6, the insertion hole 7 is positioned closer to the intermediate unit 5 than the lead-out opening 14*a*. At least a part of the insertion hole 7 is curved or bent, and the first opening 7*a* and the second opening 7*b* are each positioned on the inner side of the neck band 2.

In the sound output device 1B described above, the cable 3 is led out from the lead-out opening 14*a* to the inner side of the neck band 2, and inserted into the insertion hole 7. Since the first opening 7*a* and the second opening 7*b* are positioned on the inner side of the neck band 2, the first portion 3*c* and the second portion 3*d* respectively drawn out from the first opening 7*a* and the second opening 7*b* are positioned on the inner side of the neck band 2. Therefore, since the first portion 3*c* and the second portion 3*d* are not positioned on the outer side of the neck band 2, a hand the user 100 positioned on the outer side of the neck band 2 is less likely to contact the cable 3 unintentionally.

Figure 8:
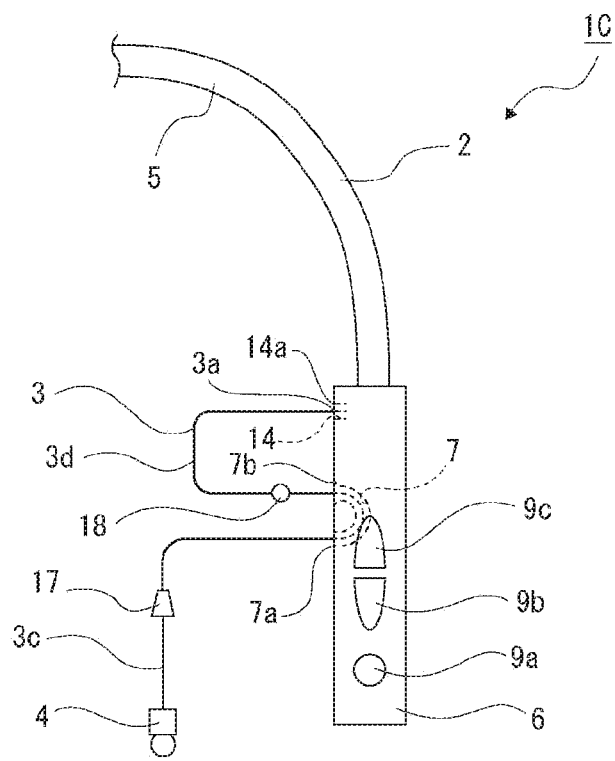

In a sound output device 1C of a third configuration example, the lead-out opening 14*a* is positioned on the inner side of the neck band 2 (see FIG. 8).

The lead-out opening 14*a* is positioned closer to the intermediate unit 5 than the insertion hole 7.

For example, at least a part of the insertion hole 7 is curved or bent, and the first opening 7*a* and the second opening 7*b* are each positioned on the inner side of the neck band 2. The second opening 7*b* is positioned closer to the intermediate unit 5 than the first opening 7*a*.

In the sound output device 1C described above, the cable 3 is led out from the lead-out opening 14*a* to the inner side of the neck band 2, and inserted into the insertion hole 7. At this time, the second portion 3*d* is positioned closer to the intermediate unit 5 than the first portion 3*c*. In this case, in a state where the earphone 4 is not worn in the ear when the neck band 2 is worn, the first portion 3*c* is at a position farther from the neck 101 than the second portion 3*d*. Therefore, the first portion 3*c* is less likely to be in contact with the neck 101 or the like, and is less likely to interfere with the user 100. Moreover, since the first portion 3*c* is at a position closer to a hand of the user 100 than the second portion 3*d* in the up-down direction in a state where the earphone 4 is not worn in the ear, the user 100 can easily wear the earphone 4 by picking up the earphone 4 connected to the first portion 3*c* or a tip end thereof.

Moreover, in the sound output device 1C described above, the cable 3 is led out from the lead-out opening 14*a* to the inner side of the neck band 2, and inserted into the insertion hole 7. Since the first opening 7*a* and the second opening 7*b* are positioned on the inner side of the neck band 2, the first portion 3*c* and the second portion 3*d* of the cable 3 respectively drawn out from the first opening 7*a* and the second opening 7*b* are positioned on the inner side (the neck 101 side of the user 100) of the neck band 2. Therefore, since the first portion 3*c* and the second portion 3*d* are not positioned on the outer side of the neck band 2, a hand the user 100 positioned on the outer side of the neck band 2 is less likely to contact the cable 3 unintentionally.

Note that, in the above, an example has been shown in which the first opening 7*a* is positioned on the inner side of the neck band 2, and the second opening 7*b* and the lead-out opening 14*a* are individually on the inner side or the outer side of the neck band 2. However, the first opening 7*a*, the second opening 7*b*, and the lead-out opening 14*a* may be individually formed at any positions on the arrangement unit 6.

Figure 9:
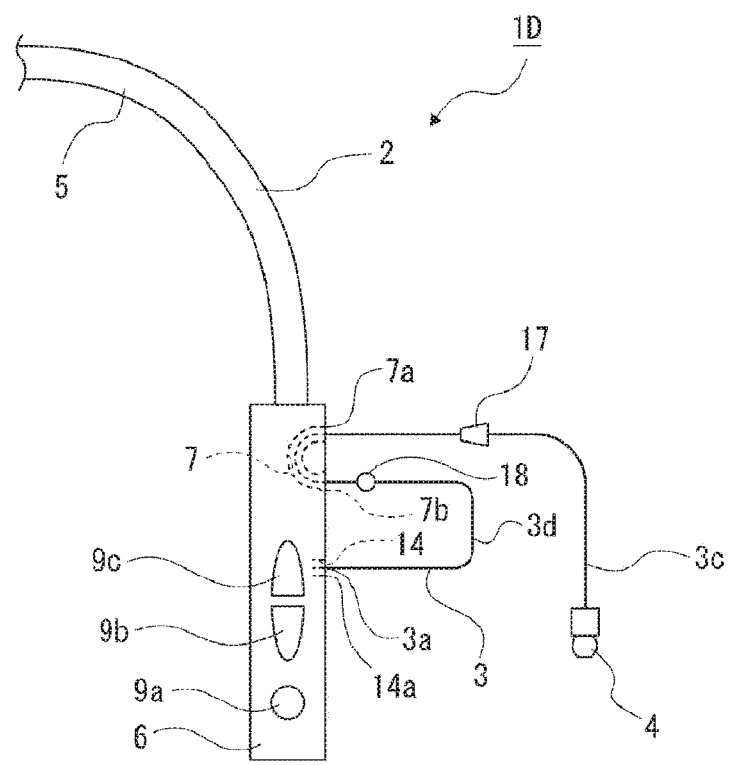
Figure 10:
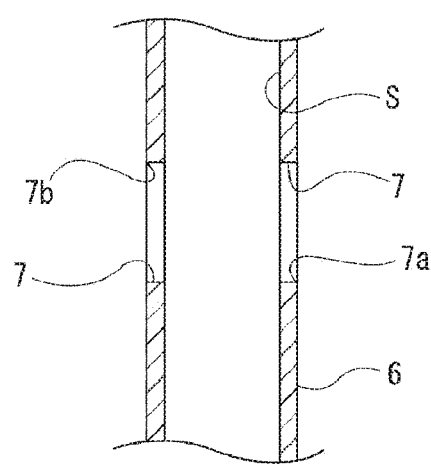

For example, the first opening 7*a* may be positioned on the outer side of the neck band 2 (see FIG. 9). In this case, since the first portion 3*c* is positioned on the outer side of the neck band 2 that is easily accessible by a hand of the user 100, the first portion 3*a* can be easily drawn out. Furthermore, in addition to the first opening 7*a*, the second opening 7*b* and the lead-out opening 14*a* may be individually positioned on the outer side of the neck band 2. In this case, since the second portion 3*d* is positioned on the outer side of the neck band 2 together with the first portion 3*c*, the second portion 3*d* can be easily drawn out in addition to the first portion 3*c*.

Note that, in the above, an example has been shown in which the first opening 7*a*, the second opening 7*b*, and the lead-out opening 14*a* are opened on the inner side or the outer side of the neck band 2. However, the first opening 7*a*, the second opening 7*b*, the lead-out opening 14*a*, and the insertion hole 7 may be opened at any position on an outer peripheral surface or a tip end surface of the arrangement unit 6.

Note that, in the above, an example has been shown in which the insertion hole 7 penetrating the neck band 2 is formed in the arrangement unit 6, and the openings on both sides of the insertion hole 7 are individually made as the first opening 7*a* and the second opening 7*b*. However, a shape of the insertion hole 7 is not limited to the above example. For example, two insertion holes 7 and 7 that connect an internal space of the arrangement unit 6 with the outside may be formed, and the outward openings in the insertion holes 7 and 7 each may be formed as the first opening 7*a* and the second opening 7*b* (see FIG. 10).

Although an example has been shown in which the insertion hole 7 is formed in the arrangement unit 6 in the above, the insertion hole 7 may be formed at any other position of the neck band 2, such as a part of the intermediate unit 5, for example.

Note that the effects described in this specification are merely examples and are not limited, and other effects may be present.

<The Present Technology>

The present technology can have the following configurations.

(1)

A sound output device including:

a neck band to be worn on a user's neck and having an insertion hole;

a cable partially led out from the neck band; and an earphone connected to the cable, in which the cable can be drawn out from the neck band to both sides of the insertion hole, and a length of a portion on both sides of the insertion hole in the cable is changed by changing a position of an inserted portion of the cable in the insertion hole.

(2)

The sound output device according to (1) above, in which the neck band has an intermediate unit that is curved or at least partially bent, and an arrangement unit individually continued to both ends of the intermediate unit and arranged with an internal structure.

(3)

The sound output device according to (2) above, in which a diameter of the arrangement unit is made larger than a diameter of the intermediate unit, and the insertion hole is formed in the arrangement unit.

(4)

The sound output device according to (2) above or (3) above, in which the insertion hole has a first portion extending in a predetermined direction and a second portion inclined with respect to the first portion.

(5)

The sound output device according to any one of (2) above to (4) above, in which two of the arrangement units are positioned apart from each other substantially left and right in a state where the neck band is worn on the user's neck, and when a side where both are facing in two of the arrangement units is an inner side, one opening of the insertion hole is positioned on the inner side, and another opening of the insertion hole is positioned on an outer side.

(6)

The sound output device according to any one of (2) above to (4) above, in which two of the arrangement units are positioned apart from each other substantially left and right in a state where the neck band is worn on the user's neck, and when a side where both are facing in two of the arrangement units is an inner side, one opening and another opening of the insertion hole are positioned on the inner side.

(7)

The sound output device according to any one of (2) above to (6) above, in which a lead-out opening through which the cable is led out is formed in the arrangement unit, and the insertion hole is positioned closer to the intermediate unit than the lead-out opening.

(8)

The sound output device according to any one of (2) above to (6) above, in which a lead-out opening through which the cable is led out is formed in the arrangement unit, and the lead-out opening is positioned closer to the intermediate unit than the insertion hole.

(9)

The sound output device according to any one of (2) above to (8) above, in which the cable supports a stopper configured to restrict movement of the cable with respect to the neck band.

(10)

The sound output device according to (9) above, in which the stopper is supported slidably by the cable.

(11)

The sound output device according to (9) above or (10) above, in which at least a part of the stopper can be inserted into the insertion hole.

(12)

The sound output device according to (11) above, in which a diameter of at least a part of the insertion hole decreases as going inward in the neck band.

(13)

The sound output device according to any one of (9) above to (12) above, in which when an end portion connected with the earphone in the cable is defined as one end portion, the stopper is positioned between the one end portion of the cable and the inserted portion.

(14)

The sound output device according to (13), in which the stopper is formed to have an outer shape of a substantially truncated cone shape.

(15)

The sound output device according to any one of (9) above to (12) above, in which a lead-out opening through which the cable is led out is formed in the arrangement unit, and when a portion positioned in the lead-out opening in the cable is defined as a lead-out starting end, the stopper is positioned between the lead-out starting end and the inserted portion in the cable.

(16)

The sound output device according to any one of (9) above to (12) above, in which two of the stoppers are provided and positioned on opposite sides with the inserted portion interposed in between.

(17)

The sound output device according to (16) above, in which the two stoppers are each formed in different shapes.

(18)

The sound output device according to any one of (2) above to (17) above, in which a communication device is provided as the internal structure, and the communication device is disposed at a tip end portion of the arrangement unit.

REFERENCE SIGNS LIST

1 Sound output device
2 Neck band
3 Cable
3a Lead-out starting end
3b Inserted portion
3c First portion
3d Second portion
4 Earphone
5 Intermediate unit
6 arrangement unit
7 Insertion hole
7a First opening
7b Second opening
14a Lead-out opening
15 First insertion part
16 Second insertion part
17 First stopper
18 Second stopper
1A Sound output device
1B Sound output device
1C Sound output device

The invention claimed is:
1. A sound output device, comprising:
a neck band wearable on a user neck, wherein
the neck band includes:
an intermediate unit that is one of curved or at least partially bent, wherein the intermediate unit includes a first end and a second end;
a first arrangement unit at the first end of the intermediate unit;
a second arrangement unit at the second end of the intermediate unit, wherein each of the first arrangement unit and the second arrangement unit comprises an internal structure; and an insertion hole in each of the first arrangement unit and the second arrangement unit, wherein
the insertion hole includes a first portion and a second portion,
the first portion extends in a specific direction, and the second portion is inclined with respect to the first portion;
a cable partially led out from the neck band; and
an earphone connected to the cable, wherein
the cable is drawable from the neck band to both a first side of the insertion hole and a second side of the insertion hole, and
a length of a portion of the cable on both the first side of the insertion hole and the second side of the insertion hole is changeable based on change of a position of an inserted portion of the cable in the insertion hole.

2. The sound output device according to claim 1, wherein a diameter of each of the first arrangement unit and the second arrangement unit is larger than a diameter of the intermediate unit.

3. The sound output device according to claim 1, wherein in a state where the neck band is worn on the user neck,
the first arrangement unit is spaced apart from the second arrangement unit and
the first arrangement unit is on a left side of the user neck and the second arrangement unit is on a right side of the user neck, and
in a case where an inner side of the first arrangement unit faces an inner side the second arrangement unit,
the first side of the insertion hole is on each of the inner side of the first arrangement unit and the inner side of the second arrangement unit, and
the second side of the insertion hole is on each of an outer side of the first arrangement unit and an outer surface of the second arrangement unit.

4. The sound output device according to claim 1, wherein in a state where the neck band is worn on the user neck,
the first arrangement unit is spaced apart from the second arrangement unit, and
the first arrangement unit is on left side of the user neck and the second arrangement unit is on right of the user neck, and
in a case where an inner side of the first arrangement unit faces an inner side of the second arrangement unit, each of the first side of the insertion hole and the second side of the insertion hole is on the inner side of the first arrangement unit and the inner side of the second arrangement unit.

5. The sound output device according to claim 1, wherein each of the first arrangement unit and the second arrangement unit further comprises a lead-out opening,
the cable is led out through the lead-out opening, and
the insertion hole is closer to the intermediate unit than the lead-out opening.

6. The sound output device according to claim 1, wherein each of the first arrangement unit and the second arrangement unit further comprises a lead-out opening;
the cable is led out through the lead-out opening, and
the lead-out opening is closer to the intermediate unit than the insertion hole.

7. The sound output device according to claim 1, wherein the cable is configured to support a first stopper and a second stopper, and
each of the first stopper and the second stopper is configured to restrict a movement of the cable with respect to the neck band.

8. The sound output device according to claim 7, wherein each of the first stopper and the second stopper is supported slidably by the cable.

9. The sound output device according to claim 7, wherein at least a part of each of the first stopper or the second stopper is insertable in the insertion hole.

10. The sound output device according to claim 9, wherein a diameter of at least a part of the insertion hole decreases towards inward direction in the neck band.

11. The sound output device according to claim 7, wherein an end portion of the cable is connected with the earphone, and
the first stopper is between the end portion of the cable and the inserted portion of the cable.

12. The sound output device according to claim 11, wherein an outer shape of the first stopper is a truncated cone shape.

13. The sound output device according to claim 7, wherein
each of the first arrangement unit and the second arrangement unit further comprises a lead-out opening;
the cable is led out through the lead-out opening,
a portion of the cable in the lead-out opening is a lead-out starting end, and
the second stopper is between the lead-out starting end of the cable and the inserted portion of the cable.

14. The sound output device according to claim 7, wherein
the first stopper is opposite to the second stopper, and
the inserted portion is in between the first stopper and the second stopper.

15. The sound output device according to claim 14, wherein a shape of the first stopper is different from a shape of the second stopper.

16. The sound output device according to claim 1, wherein
the internal structure comprises a communication device, and
the communication device is at a tip end portion of one of the first arrangement unit or the second arrangement unit.

* * * * *